April 2, 1940.  F. C. BURT  2,195,691
FLOOR HEATER
Filed June 30, 1939
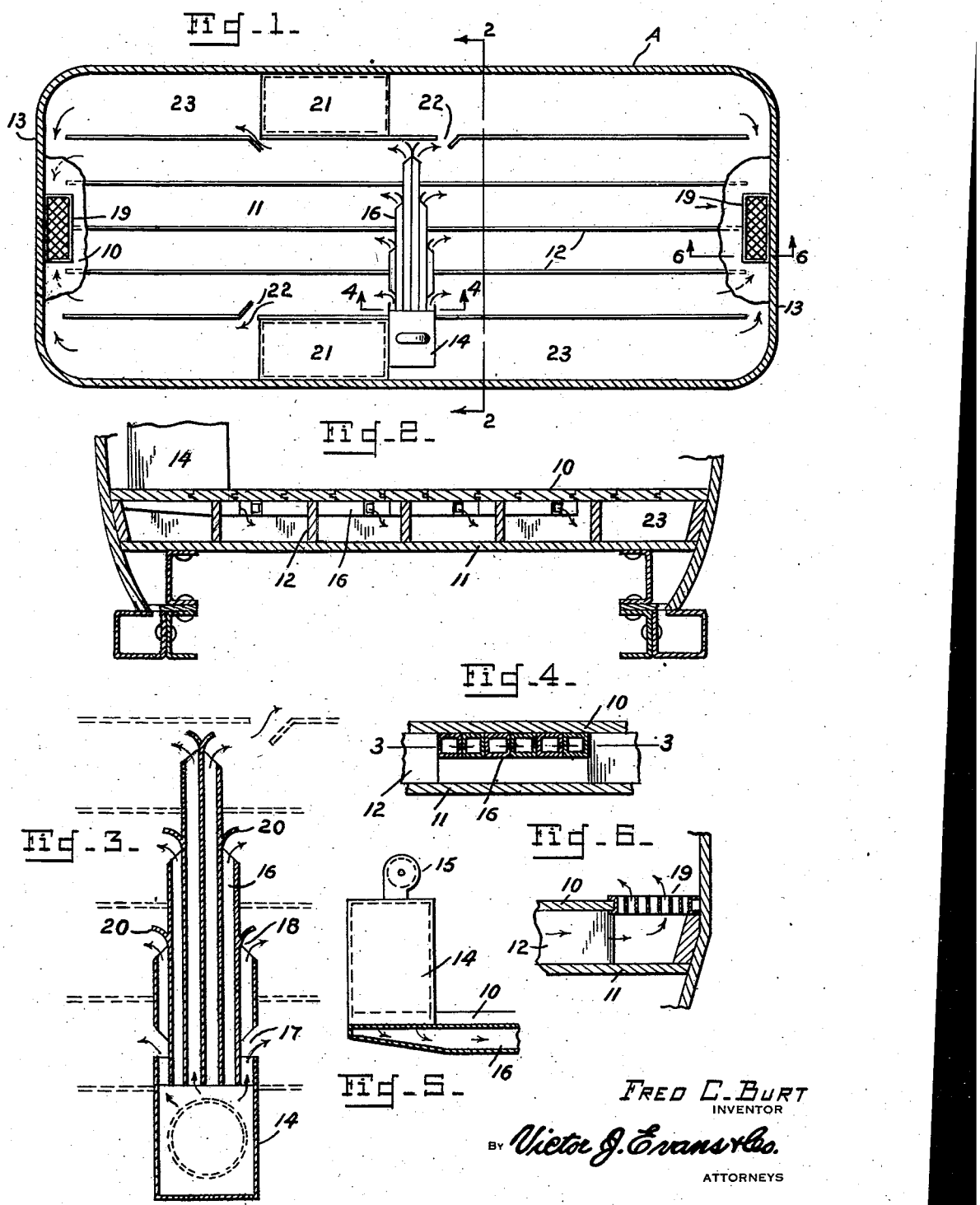
FRED C. BURT
INVENTOR
BY Victor J. Evans & Co.
ATTORNEYS

Patented Apr. 2, 1940

2,195,691

UNITED STATES PATENT OFFICE 2,195,691

FLOOR HEATER

Fred C. Burt, New Hudson, Mich.

Application June 30, 1939, Serial No. 282,243

3 Claims. (Cl. 237—69)

The invention relates to a floor heater and more especially to a heater of this character for equipping automobile trailers.

The primary object of the invention is the provision of a heater of this character wherein the trailer body has built therewith a main floor and a subfloor having therebetween partitions while communicative with the spaces between these partitions is a heater having associated therewith a fan so that cold air can be acquired or taken from the upper portion of the body of the trailer through the heater for the heating thereof and to be subsequently distributed in the said spaces so that in this manner the main floor will be heated and the temperature within the trailer body both at the lower portion and the ceiling thereof will be approximately uniform and in this way maintaining a heated interior to the trailer.

Another object of the invention is the provision of a heater of this character wherein a very few degrees difference in temperature exists at the ceiling area and the floor area interiorly of the body of the trailer and a warm floor is assured especially when the trailer is in service during extremely cold weather.

A further object of the invention is the provision of a heater of this character wherein the construction thereof is novel in its entirety and assures warmth interiorly of the body of the trailer throughout the said interior, and the floor of the trailer body will be maintained warm for comfort during cold weather in the use of the trailer.

A further object of the invention is the provision of a heater of this character which is simple in its construction, thoroughly reliable and efficacious in operation, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a horizontal sectional view taken through a trailer body, being a schematic illustration of the floor heating structure in accordance with the invention.

Figure 2 is an enlarged fragmentary sectional view taken on the line 2—2 of Figure 1 looking in the direction of the arrows.

Figure 3 is a sectional view taken on the line 3—3 of Figure 4.

Figure 4 is a sectional view taken on the line 4—4 of Figure 1 looking in the direction of the arrows.

Figure 5 is a fragmentary vertical transverse sectional view through the trailer body showing the heater proper in side elevation.

Figure 6 is a fragmentary sectional view taken on the line 6—6 of Figure 1 looking in the direction of the arrows.

Similar reference characters indicate corresponding parts throughout the several views in the drawing.

Referring to the drawing in detail, A designates generally a portion of the body of a motor vehicle trailer being of any standard construction excepting that in this instance beneath the main floor 10 interiorly of said body is a subfloor 11 being uniformly spaced from the said main floor 10, while arranged longitudinally of the body A, which is elongated between the main and subfloors 10 and 11, are spaced parallel vertically disposed partitions 12, these being joined with the said floors and at opposite ends terminate spaced from the ends 13 of said body A, so that the spaces between these partitions including the floors 10 and 11 will effect air circulating flues communicable with each other for a purpose presently described.

Interiorly of the body A and rising vertically above the main floor 10 at a point midway of the said body A is a suitable heater 14 which in its construction delivers hot air through the bottom thereof and the main floor 10 into the spaces between the partitions 12. The cold air to be heated by the heater 14 is taken in from the highermost portion interiorly of the body A through a suitable inlet leading to said heater 14 and having therein a fan 15 which sucks the cold air from this higher point, that is to say close to the ceiling of the body A, and forces such cold air into the heater 14 for the heating of the same and the subsequent delivery of the hot air between the floors 10 and 11 and the partitions 12 arranged between the latter.

Disposed transversely with relation to the partitions 12 between the floors 10 and 11 and extended from the heater 14 is a group of distributing flues or conduits 16, these being created with outlets 17 and 18, respectively, opening into the respective spaces between the partitions 12 for the distribution of hot air from the heater 14 into said spaces whence the hot air will flow laterally from this group of flues 16 in opposite directions through the said spaces and thence be delivered through heating registers 19 into the trailer body A above the main floor 10. In this manner the main floor 10 will be maintained heated and also the interior of the trailer body A above this floor 10 will be heated. By reason of the arrangement or construction as hereinbefore set forth, there will be a very small degree of difference in temperature within the trailer body A adjacent to the ceiling thereof and adjacent to the floor 10. Hot air will be circulated with a degree of continuity within the trailer body A for the heating of the same and the main floor 10 will be assured against chilling effects in that the same will be maintained warm or heated during the operation of the heater 14 in its association with the fan 15.

The outlets 18 have annexed thereto outwardly curved deflectors or baffles 20 directing the heated air laterally in opposite directions from the group of flues or conduits 16 which are in communication with the heater 14 at the lowermost portion of the said heater.

The trailer body A, as usual, has built therein boxings 21 for wheels, not shown, this being conventional, and the partitions 12 arranged close to these boxings 21 are provided with baffled openings 22 therein for the free flow of hot air circuitously past these boxings 21 into the outermost side spaces 23 so that maximum circulation of the heated air will be assured relative to the bounds of the body A of the trailer.

What is claimed is:

1. A heater for an automobile trailer body having a main floor and a subfloor spaced beneath the latter for effecting a chamber underlying and coextensive with the said main floor, comprising a heating element disposed above the main floor at a point intermediate of the said body, spaced parallel vertically disposed partitions joined with said floors, arranged therebetween and having opposite ends terminated spaced from the ends of said body whereby the spaces between the said partitions and the said floors will effect air circulating flues communicable with each other at the ends of said chamber, heating registers built in said main floor at opposite ends of the body for the communication of the said chamber with the body above the main floor, and a group of distributing conduits leading from the heater in a crosswise direction with respect to the said partitions at a point beneath the main floor and having outlets laterally directed in opposite directions communicative with the spaces between the said partitions.

2. A heater for an automobile trailer body having a main floor and a subfloor spaced beneath the latter for effecting a chamber underlying and coextensive with the said main floor, comprising a heating element disposed above the main floor at a point intermediate of the said body, spaced parallel vertically disposed partitions joined with said floors, arranged therebetween and having opposite ends terminated spaced from the ends of said body whereby the spaces between the said partitions and the said floors will effect air circulating flues communicable with each other at the ends of said chamber, heating registers built in said main floor at opposite ends of the body for the communication of the said chamber with the body above the main floor, a group of distributing conduits leading from the heater in a crosswise direction with respect to the said partitions at a point beneath the main floor and having outlets laterally directed in opposite directions communicative with the spaces between the said partitions, and outwardly curved deflectors formed with said conduits at the outlets thereof.

3. A heater for an automobile trailer body having a main floor and a subfloor spaced beneath the latter for effecting a chamber underlying and coextensive with the said main floor, comprising a heating element disposed above the main floor at a point intermediate of the said body, spaced parallel vertically disposed partitions joined with said floors, arranged therebetween and having opposite ends terminated spaced from the ends of said body whereby the spaces between the said partitions and the said floors will effect air circulating flues communicable with each other at the ends of said chamber, heating registers built in said main floor at opposite ends of the body for the communication of the said chamber with the body above the main floor, a group of distributing conduits leading from the heater in a crosswise direction with respect to the said partitions at a point beneath the main floor and having outlets laterally directed in opposite directions communicative with the spaces between the said partitions, and outwardly curved deflectors formed with said conduits at the outlets thereof, the said conduits being extended from the heater in one direction transversely within the chamber.

FRED C. BURT.